United States Patent [19]

Higuchi

[11] 4,273,835

[45] Jun. 16, 1981

[54] METHOD FOR PREPARING A CYLINDER LINER FOR LIQUID-COOLED ENGINES HAVING A BANDLIKE SEALANT ON THE OUTER-SURFACE THEREOF

[75] Inventor: Senji Higuchi, Hino, Japan

[73] Assignee: Three Bond Co., Ltd., Tokyo, Japan

[21] Appl. No.: 67,586

[22] Filed: Aug. 17, 1979

[30] Foreign Application Priority Data

Feb. 6, 1979 [JP] Japan ............ 54-12465

[51] Int. Cl.[3] ............ B32B 9/04

[52] U.S. Cl. ............ 428/446; 92/171; 123/41.84; 156/329; 156/315; 156/294; 427/387

[58] Field of Search ............ 156/329, 294, 315; 428/446; 123/41.84, 41.83; 92/171, 144, 169; 427/407.1

[56] References Cited

U.S. PATENT DOCUMENTS

| | | | |
|---|---|---|---|
| 3,403,661 | 10/1968 | Valentine et al. | 123/41.84 |
| 3,440,122 | 4/1969 | McCormick | 156/329 |
| 3,698,982 | 10/1972 | Griffin | 428/448 |
| 3,762,978 | 10/1973 | Holmes | 156/329 |

*Primary Examiner*—George F. Lesmes
*Assistant Examiner*—E. Rollins Buffalow
*Attorney, Agent, or Firm*—Martin A. Farber

[57] ABSTRACT

A cylinder liner for liquid-cooled engines having a bandlike sealant on the outer-surface thereof wherein the sealant is formed by a two-layer laminate of silicone resin having a completely cured inner layer and a half-cured outer layer. This cylinder liner has an excellent sealing effect.

4 Claims, 5 Drawing Figures

METHOD FOR PREPARING A CYLINDER LINER FOR LIQUID-COOLED ENGINES HAVING A BANDLIKE SEALANT ON THE OUTER-SURFACE THEREOF

BACKGROUND OF THE INVENTION

This invention relates to a method for making a cylinder liner for liquid-cooled engines, on the outer-surface of which, a bandlike sealant is applied. More particularly, it relates to a method of making a sealant-banded cylinder liner wherein said sealant comprises two-layer laminate of completely cured and half cured silicone resins.

As shown in FIG. 1, in liquid-cooled engines such as diesel engines, a cylinder liner 3 is generally inserted into a cylinder bore 2 of a cylinder block 1 so as to form a water jacket 4 for cooling water between the block 1 and the liner 3. In such engines, two O-rings 6 and 6' are set in recesses on a protruding wall 5 of the cylinder bore 2 and they seal the water jacket to prevent leaking of cooling water into an oil pan (not shown).

The cylinder liner 3 of such engines tends to bulge due to the combustion pressure of fuels during its operation, or vibrate intricately in the cylinder bore 2 due to reciprocating motions of the pistons. Then, cavitations occur in the cooling water of the water jacket 4, which lead to fatigue failures of the liner 3 and accelerate its corrosion. If the cylinder liner 3 is corroded markedly, it shows poor mechanical strength and short lifetime. Especially, the narrower a clearance 7 between the protruding wall 5 in the bore 2 and the cylinder liner 3, the more cavitations develop. Hence, it is corroded severely.

Further, O-rings 6 are worn out by vibrations of the cylinder liner 3, and then the cooling water in the water jacket 4 possibly leaks into the oil pan or a crank case (not shown).

Heretofore, a sealant 8 (FIG. 2) such as synthetic resins, in addition to these O-rings, has been filled into the clearance 7 around its entrance part to prevent cavitations and the cooling water leakage, in order to improve the above mentioned disadvantages. In such prior art, for example, a sealant is forced into a channel (not shown) slotted on the outer surface of the liner 3, or is sprayed onto the inner surface of the cylinder block 1 to form a sealant band thereon by means of an air-gun.

However, according to these methods, it takes a longer time to apply the sealant or it is difficult to obtain sufficient adherence between the sealant and the cylinder block or the cylinder liner. Thus, desirable sealing effects can not be attained by these known methods.

SUMMARY OF THE INVENTION

Accordingly, it is an object of this invention to provide an improved method of making a cylinder liner in which a special sealant is applied on the outer-surface thereof to seal faultlessly around an entrance part of a clearance formed between the cylinder surface and the protrudent wall of the cylinder block.

According to this invention, a method for preparing a cylinder liner for liquid-cooled engines having a bandlike sealant on the outer-surface thereof which comprises coating a putty silicone resin on the outer-surface of the cylinder liner to form a beltlike layer, curing the resin completely, further applying the resin on the completely cured resin, and half-curing the applied resin, thereby forming a two-layer laminate of silicone resin having a completely cured inner layer and a half-cured outer layer.

BRIEF DESCRIPTION OF DRAWINGS

Other objects and advantages will be apparent from the ensuing specification and drawings in which.

DETAILED DESCRIPTION

Figure 1:
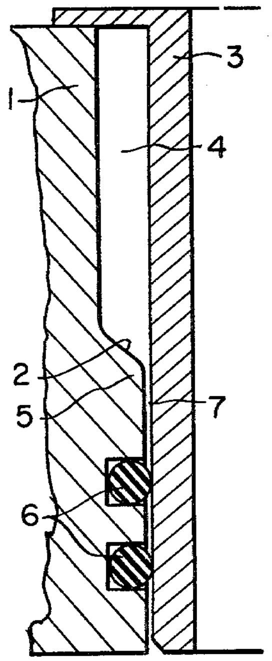
PRIOR ART FIG. 1
FIGS. 1 and 2 are elevational views in section of known cylinder liners in liquid cooled engines.
Figure 2:
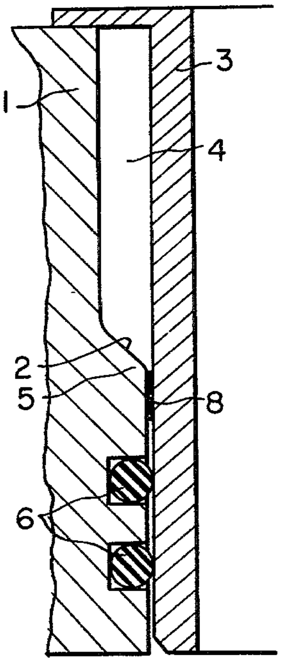
PRIOR ART FIG. 2
Figure 3:
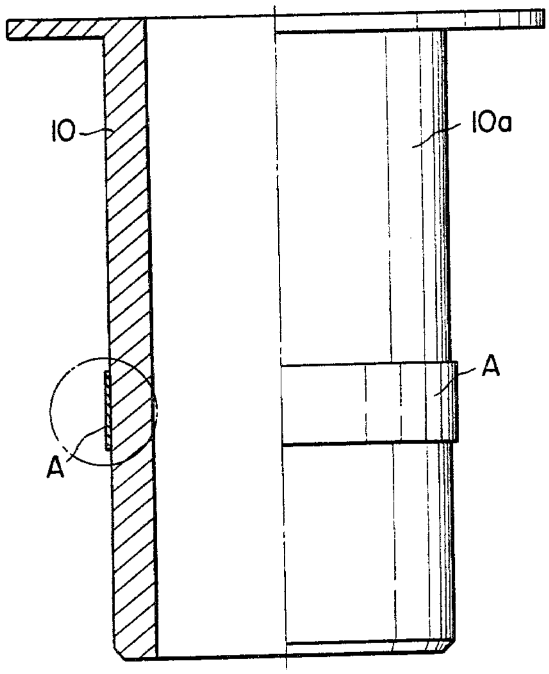
FIG. 3 is an elevational views in section of this invention.
Figure 5:
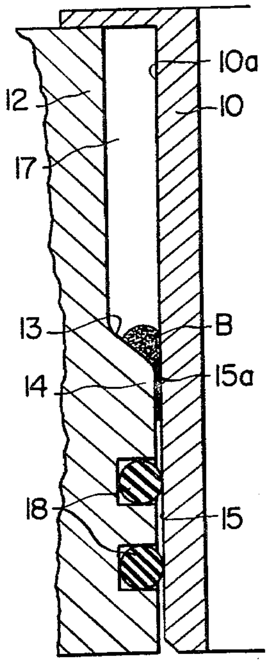
FIG. 5 is an elevational view in section of a cylinder liner inserted in a cylinder bore.
Figure 4:
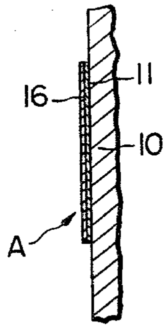
FIG. 4 is an expanded sectional view of the banded sealant of FIG. 3.

Referring to the embodiment of this invention shown in FIGS. 3 to 5 inclusive, a cylinder liner 10 is partly coated with a silicone resin on its outer-surface **10*a* to form a belt-like sealant layer A. Prior to this resin coating process, a sphere to be coated should be fixed on the outer surface 10*a* of the liner 10, which corresponds to an entrance part 15*a* of a clearance 15 formed between the liner 10 and a protruding wall 14 when the liner 10 is inserted into a cylinder bore 13 of cylinder block 12. The outer surface 10*a*** is then masked by means of a masking tape leaving the belt-like sphere unmasked, where a putty silicone resin is applied to a thickness of about 50 to 100 micron.

Such silicone resin is preferably an organopolysiloxane composition containing a hardener such as organotin compounds, i.e. tin laurate, a silane coupling agent for improving its adherence, and a platinum catalyst. Then, after stripping the masking tape, the putty silicone resin is heated to a temperature of about 120° C. for 1 hour and cured to form a completely cured resin layer 11. Thus the cylinder liner 10 is banded with the cured belt-like resin layer 11. The term "completely cured" means such an elastic state as gum. Then, the same silicone resin is further applied on the completely cured resin to a thickness of about 700 to 800 microns and cured to form a half-cured resin 16. The term "half-cured" means such state that the resin does not show any restoration by a finger pressure and yet it does not adhere to the finger. Such a half-cured state may be obrained by letting the resin stand in the atmosphere at room temperature for 24 hours or more. Both of these completely cured and half-cured resins provide a two-layer laminate A in which two resins strongly adhere to each other. The laminate A is thicker than the clearance 15.

In FIG. 5 a water jacket 17 and O-rings 18 respectively are illustrated.

Thus, according to this invention, the sealant-banded cylinder liner for liquid-cooled engines, which is banded on the outer-surface of the cylinder liner, can be made by a very simple process. While the sealing band comprises a two-layer laminate of silicone resin, which consists of the inner layer of a completely cured resin 11 and the outer layer of a half-cured resin 16, it exhibits excellent sealing effects. This will be explained particularly with reference to FIG. 5. At first, the cylinder liner 10 is inserted into the cylinder bore 13 of the cylinder block 12. Since the laminate A on the outer surface **10*a* is thicker than the clearance 15, the surface of the half-cured resin layer 16 is scraped by the protruding wall 14 and rises around the entrance part 15*a* when the liner 10 is inserted into the bore 13, thereby the entrance part 15***a* is sealed. On the other hand, the completely cured resin 11 has been completely cured and adhered firmly to the outer surface 10*a;* therefore, it is not scraped nor does it rise.

The half-cured resin layer 16 is gradually cured by the cooling water heated in the water jacket 17 during operation and the two-layer laminate A forms a completely cured monolayer (sealant B). The sealant B adheres to the cylinder liner 10 and the cylinder block 13 firmly. As the laminate A fills the region suitably around the entrance part 15*a* and is cured as in this position, the resultant sealant B has an excellent sealing effect.

Further, because of excellent elasticity, vibration resistance, heat resistance and humidity resistance of the cured silicone resin due to its three-dimensional network, the sealant B can sufficiently withstand vibrations of piston motions or high combustion temperature of fuels to seal the clearance 15 effectively. When the sealant B is used in combination with O-rings 18, its sealing effect is improved.

As described above, the cylinder liner made by this invention has the two-layer laminate consisting of the inner layer of completely cured resin and the outer layer of half-cured resin on the outer surface thereof, securing perfect sealing of the clearance between the outer surface of the cylinder liner and the protruding wall of the cylinder block to prevent leakage of cooling water from the water jacket into the crank space and to avoid possible occurrence of cavitations. Further, such a cylinder liner can be obtained easily and rapidly by the method of this invention. Finally, it is apparent that the method of making the cylinder liner herein described constitutes an epock-making invention which overcomes disadvantages of the prior art.

I claim:

1. A method for preparing a cylinder liner for liquid-cooled engines having a bandlike sealant on the outer-surface thereof comprising the steps of coating a putty silicone resin on the outer-surface of said cylinder line to form a belt-like layer, curing said resin completely, further applying said resin on said completely cured resin, and half curing said applied resin to form a two-layer laminate of silicone resin having a completely cured inner layer and a half-cured outer layer.

2. The method as claimed in claim 1 in which said silicone resin is a composition having mainly an organopoly siloxane therein.

3. The method as set forth in claim 1, further comprising the step of forming the two-layer laminate in said previously mentioned steps such that the two-layer laminate is thicker than a clearance between the outer-surface of said cylinder liner and a protruding wall of a cylinder block formed in a cylinder bore of the cylinder block under a water jacket portion of the cylinder bore, inserting said cylinder liner downwardly into the cylinder bore, thereby scraping a surface of the half-cured outer layer of said two-layer laminate by said protruding wall causing the half-cured outer layer to rise above an entrance part of the clearance thereby sealing the entrance part, gradually curing the half-cured outer layer by cooling water heated in the water jacket portion during operation of the engine.

4. A cylinder liner produced by the method of claim 1 or 3.

* * * * *